United States Patent
Wale et al.

(10) Patent No.: US 11,368,044 B2
(45) Date of Patent: Jun. 21, 2022

(54) IN-USE CHARGING FOR WEARABLE DEVICES HAVING PARTITIONED BATTERIES

(71) Applicant: Micron Technology, Inc., Boise, ID (US)

(72) Inventors: Madison E. Wale, Boise, ID (US); Bhumika Chhabra, Boise, ID (US); Claudia A. Delaney, Garden City, ID (US); Elsie de la Garza Villarreal, Nampa, ID (US)

(73) Assignee: Micron Technology, Inc., Boise, ID (US)

( * ) Notice: Subject to any disclaimer, the term of this patent is extended or adjusted under 35 U.S.C. 154(b) by 106 days.

(21) Appl. No.: 16/880,765

(22) Filed: May 21, 2020

(65) Prior Publication Data

US 2021/0367445 A1 Nov. 25, 2021

(51) Int. Cl.
*H01M 10/44* (2006.01)
*H01M 10/46* (2006.01)
*H02J 7/35* (2006.01)
*H02J 7/00* (2006.01)

(52) U.S. Cl.
CPC .............. *H02J 7/35* (2013.01); *H02J 7/0047* (2013.01)

(58) Field of Classification Search
CPC ........... H02J 7/0047; H02J 7/35; H02J 7/0042
USPC ................. 320/101, 107, 114, 116, 132, 149
See application file for complete search history.

(56) References Cited

U.S. PATENT DOCUMENTS

| 9,237,211 B2 * | 1/2016 | Tabe ............... H04M 1/72403 |
| 2014/0042974 A1 | 2/2014 | Yang et al. |
| 2014/0097786 A1 | 4/2014 | Grimes et al. |
| 2019/0305714 A1 | 10/2019 | Garcia |

FOREIGN PATENT DOCUMENTS

| KR | 10-20160024644 A | 3/2016 |
| KR | 101965888 B1 | 4/2019 |

OTHER PUBLICATIONS

International Search Report and Written Opinion dated Aug. 25, 2021 for International Patent Application No. PCT/US2021/030961, 9 pages.

\* cited by examiner

*Primary Examiner* — Edward Tso
(74) *Attorney, Agent, or Firm* — Perkins Coie LLP

(57) ABSTRACT

Methods and apparatuses for in-use charging for wearable devices are described, in which the wearable device may include an energy harvesting unit coupled with a rechargeable battery unit. The energy harvesting unit may include one or more transducers configured to generate electrical energy from various types of non-electrical energy around the wearable device such that the wearable device may replenish the rechargeable battery unit while a person uses the wearable devices. Such non-electrical energy may include electromagnetic energy, light energy, thermal energy, kinetic energy, or the like. Additionally, the rechargeable battery unit may include two or more partitions such that one of the partitions may be detached when necessary (e.g., to replace with a fully charged partition) without disrupting operations of the wearable device.

15 Claims, 4 Drawing Sheets

IN-USE CHARGING FOR WEARABLE DEVICES HAVING PARTITIONED BATTERIES

TECHNICAL FIELD

The present disclosure generally relates to wearable devices, and more particularly relates to in-use charging for wearable devices.

BACKGROUND

Wearable devices and/or technologies generally refer to electronic apparatuses and associated technologies incorporated into forms of personal accessories and/or clothing, which may be worn by users. Such wearable devices are typically equipped with electronic data storage, computing and/or wireless communication capabilities, as well as sensing components to monitor certain physiological functions of the users. The wearable devices are widely deployed to provide users with convenient means, for example, to connect with other electronic devices, to monitor users' vital signs to assess general health conditions, or the like. The wearable devices, however, require electrical power from batteries and often need to be removed from the users to recharge or replace the batteries, which tends to disrupt their operation. It would be beneficial for the users to have their wearable devices to operate seamlessly without having to remove (or otherwise disrupt) the wearable devices.

DETAILED DESCRIPTION

Figure 1:
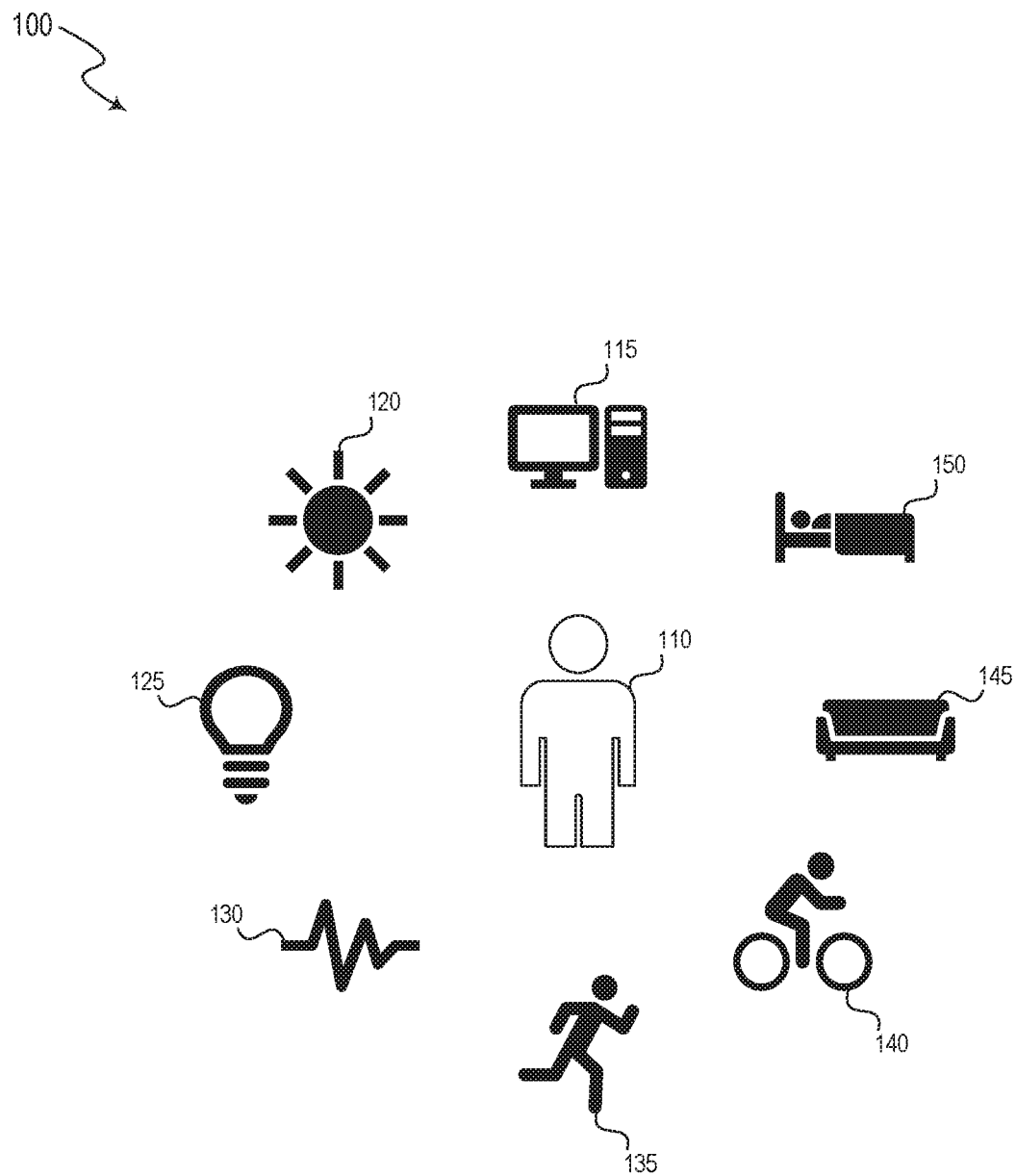
FIG. 1 illustrates various sources of non-electrical energy that support in-use charging for wearable devices in accordance with embodiments of the present technology.

Wearable devices (e.g., smart wristwatches, activity trackers), which may be in various forms of personal accessories, provide maximum benefit to the users when they operate seamlessly without any disruption—e.g., maintaining wireless connections with other electronic devices (e.g., users' mobile phones, tablets), collecting physiological data from the users (e.g., pulse rates, temperatures, respiration rates), monitoring the users' vital signs to assess general health conditions, etc. Such wearable devices typically include several components (e.g., a display, a memory component, sensing components, computing and/or wireless communication components) that require electrical power to operate. Accordingly, the wearable devices are equipped with rechargeable (or replaceable) batteries to supply electrical power, but the users may have to remove their wearable devices to recharge (or to replace) batteries, causing undesirable disruptions.

Several embodiments of the present technology may enable wearable devices to generate electrical energy from various non-electrical energy while the users are wearing (or otherwise using) the wearable devices. In this manner, the wearable devices may recharge the batteries without having to be removed from the users—e.g., to avoid disruptions in their operation. In some cases, the non-electrical energy may be in the forms of thermal energy or kinetic energy, which may be generated by the users. In other cases, the non-electrical energy may be in the forms of electromagnetic energy or light energy present in daily environment, where the users may work or exercise. As such, the wearable devices in accordance with embodiments of the present technology may include one or more transducers configured to convert such non-electrical energy into electrical energy. Further, the wearable devices in accordance with embodiments of the present technology may include a rechargeable battery unit with two or more partitions that each are configured to supply electrical power to the wearable devices. Accordingly, one of the partitions may be detached from the rechargeable battery unit without interrupting the wearable devices' operation—e.g., when a partition of the rechargeable battery is detached to be replaced with another partition fully charged.

In some embodiments, the wearable device (e.g., a smart wristwatch) may sense first non-electrical energy (e.g., electromagnetic energy) greater than a first threshold—e.g., a user wearing the wearable device may be working with a computer coupled with a wireless mouse and/or a wireless keyboard. The wearable device may activate a first transducer configured to convert the first non-electrical energy (e.g., the electromagnetic energy associated with the wireless coupling between the computer and the wireless mouse and/or keyboard) into electrical energy and store the electrical energy in a rechargeable battery unit of the wearable device. Additionally, or alternatively, the wearable device may sense second non-electrical energy (e.g., kinetic energy) greater than a second threshold—e.g., the user may be jogging after working with the computer. The wearable device may activate a second transducer configured to convert the second non-electrical energy (e.g., the kinetic energy associated with the user's arm movements while jogging) into electrical energy and store the electrical energy in the rechargeable battery unit. In this manner, the wearable device may recharge the rechargeable battery unit and/or supplement electrical energy stored in the rechargeable battery unit without disrupting operations of the wearable device—e.g., due to recharging or replacing the rechargeable battery unit.

In some embodiments, the wearable device may monitor an amount of total electrical energy available in the rechargeable battery unit. The rechargeable battery unit may include a set of partitions, including at least one partition configured to be isolated from (e.g., disconnected from) supplying electrical power to the wearable device—while other partitions continue to supply electrical power. As such, the at least one partition can be detached without disrupting the wearable device's operation. The wearable device may display the amount of total electrical energy available in the rechargeable battery unit when the amount is equal to or less than a threshold (e.g., 20%, 15%, 10%), along with a message soliciting the user's input directed to whether the user wants to supplement the electrical energy. In some instances, the user may detach the partition isolated from supplying electrical power to replace the detached partition with a partition that has been fully charged. In other instances, the user may detach the partition to recharge the detached partition using a separate charging device.

Various sources of non-electrical energy that support in-use charging for wearable devices in accordance with embodiments of the present technology is shown in FIG. 1. Detailed descriptions of the wearable device that supports in-use charging in accordance with embodiments of the present technology are provided with reference to FIG. 2. Flowcharts illustrating methods of in-use charging for wearable devices in accordance with embodiments of the present technology are described with reference to FIGS. 3 and 4.

FIG. 1 illustrates a diagram 100 including various sources of non-electrical energy that support in-use charging for wearable devices in accordance with embodiments of the present technology. The diagram 100 also depicts a person 110 with a wearable device (not shown) surrounded by the various sources of non-electrical energy that may be used to recharge a battery in the wearable device. For example, the diagram 100 includes a computer 115 having one or more wireless peripheral devices (e.g., a wireless mouse, a wireless keyboard) that the person 110 may use. In some instances, the person 110 may wear a smart wristband (e.g., a wearable device) that may be in close proximity to the wireless peripheral devices (e.g., the smart wristband may lie on a palm rest of the wireless keyboard). The smart wristband may include a transducer (e.g., a coil-based transducer, an antenna-based transducer) that converts electromagnetic (EM) energy (e.g., the EM field associated with the wireless coupling between the computer 115 and its wireless peripheral devices) into electrical energy while the person 110 uses the computer 115.

The diagram 100 also depicts sources of light energy shining on the person 110 (hence the wearable device that the person 110 wears)—e.g., the sun 120, a light source 125 (e.g., a light bulb). The wearable device may include a transducer (e.g., photovoltaic cells) that convert the light energy from the sun 120 and/or the light source 125 into electrical energy while the person 110 is exposed to the sun 120 (e.g., jogging on a trail) or the light source 125 (e.g., working in an office). In addition, the sun 120 may provide thermal energy to the wearable device.

The diagram 100 also depicts sources of kinetic energy generated by the person 110. The kinetic energy may include first kinetic energy generated by the person 110—e.g., the heartbeat 130, the body movements 135 (e.g., arm movements while jogging or walking). The wearable device may include a transducer (e.g., a micro-generator based on a piezoelectric material) that converts the heartbeat 130 into electrical energy. Further, the wearable device may include a transducer (e.g., a micro-generator based on an electromechanical transducer) that converts the bodily movements 135 (e.g., various physical activities of the person 110) into electrical energy. Additionally, the kinetic energy may include second kinetic energy associated with mechanical movements of an equipment that the person 110 operates. For example, the person 110 may ride a bicycle (e.g., mechanical movements of the pedals) or operate a rowing machine in a gym (e.g., mechanical movements of the row). The wearable device may include a transducer (e.g., a micro-generator based on an electromechanical transducer) that converts the mechanical movements 140 of the equipment into electrical energy.

The diagram 100 also depicts sources of thermal energy generated by the person 110—e.g., the body heat of the person 110 while resting on a couch 145 or sleeping in a bed 150. The wearable device may include a transducer (e.g., a micro-generator based on an electrothermal transducer) that converts the thermal energy generated by the person 110 into electrical energy.

In some embodiments, a wearable device may include multiple transducers of different kinds (e.g., an antenna-based transducer, a photovoltaic transducer, a piezoelectric transducer, an electromechanical transducer) to generate electrical energy from the various sources of non-electrical energy. The wearable device, in operation, may sense first non-electrical energy (e.g., electromagnetic (EM) energy emanating from the computer 115 and/or wireless peripheral devices coupled with the computer 115) greater than a first threshold, where the first non-electrical energy is proximate to a person wearing the wearable device (e.g., the person 110 using the computer 115).

Based on sensing the first non-electrical energy (e.g., the EM energy from the computer 115) that is greater than the first threshold, the wearable device may activate a first transducer (e.g., the antenna-based transducer) configured to convert the first non-electrical energy into electrical energy. The first threshold may be related to an energy conversion efficiency of the first transducer such that output electrical energy generated by the first transducer is greater than input electrical energy consumed by the first transducer, when activated. In this manner, the wearable device may gain net electrical energy via activating the first transducer. Further, the first transducer may be coupled with a rechargeable battery of the wearable device such that the wearable device may store the output electrical energy (generated from the first non-electrical energy) in the rechargeable battery. In some embodiments, the rechargeable battery may include a set of partitions, where at least one partition of the set is configured to be detached without interrupting electrical power to the wearable device.

Additionally, or alternatively, the wearable device may sense second non-electrical energy (e.g., light energy from the lighting source 125) greater than a second threshold, where the second non-electrical energy is proximate to the person wearing the wearable device (e.g., indoor lighting shining to the person 110 with the wearable device). The wearable device may activate a second transducer of the wearable device (e.g., the photovoltaic transducer), where the second transducer is configured to convert the second non-electrical energy into electrical energy. Further, the second transducer may also be coupled with the rechargeable battery such that the wearable device may store the electrical energy (generated from the second non-electrical energy) in the rechargeable battery.

In this regard, the wearable device may include two or more transducers (e.g., the first transducer and the second transducer) that may be concurrently activated to generate electrical energy, for example, when the first non-electrical energy is greater than the first threshold and the second non-electrical energy is greater than the second threshold, respectively. In other cases, the wearable device may deactivate one or more transducers when the environment surrounding the person changes. In some embodiments, the wearable device may determine that the first non-electrical energy is less than a third threshold, where the first threshold is greater than the third threshold. Subsequently, the wearable device may deactivate the first transducer of the wearable device based, at least in part, on the determination—e.g., the wearable device may not achieve a net gain in electrical energy when the first transducer remains active. In some embodiments, the wearable device may deactivate the first transducer when the first non-electrical energy becomes less than the first threshold.

Further, individual partitions of the rechargeable battery may be coupled with different transducers of the wearable device based on various factors—e.g., abundance of certain types of non-electrical energy, energy conversion efficiencies of individual transducers, different thresholds associated with different transducers. Similarly, individual transducers of the wearable device may be coupled with different partitions of the rechargeable battery. For example, the first transducer may be coupled with a first partition of the rechargeable battery, and the second transducer may be coupled with a second partition of the rechargeable battery. In some cases, the first and second transducers may be concurrently coupled with a first partition of the rechargeable battery—e.g., when the first partition of the rechargeable battery needs the electrical energy the most, and other partitions of the rechargeable battery are nearly full. In other cases, the first and second partitions of the rechargeable battery may be concurrently coupled with a first (or a second) transducer—e.g., when the first (or the second) non-electrical energy is most abundant. In this manner, the wearable device may become versatile to increase its efficiency of generating electrical energy from various sources of non-electrical energy, which may change based on the person's environment, to replenish the rechargeable battery.

In some embodiments, the wearable device may determine that a first partition of the rechargeable battery, which may be coupled with the first transducer, includes room to store additional electrical power. Subsequently, the wearable device may search and sense the first non-electrical energy available for the wearable device (e.g., greater than the first threshold). In some embodiments, the wearable device may determine to supplement electrical power of a first partition of the rechargeable battery, prior to activating the first transducer of the wearable device, where the first partition of the rechargeable battery is coupled with the first transducer.

Figure 2:
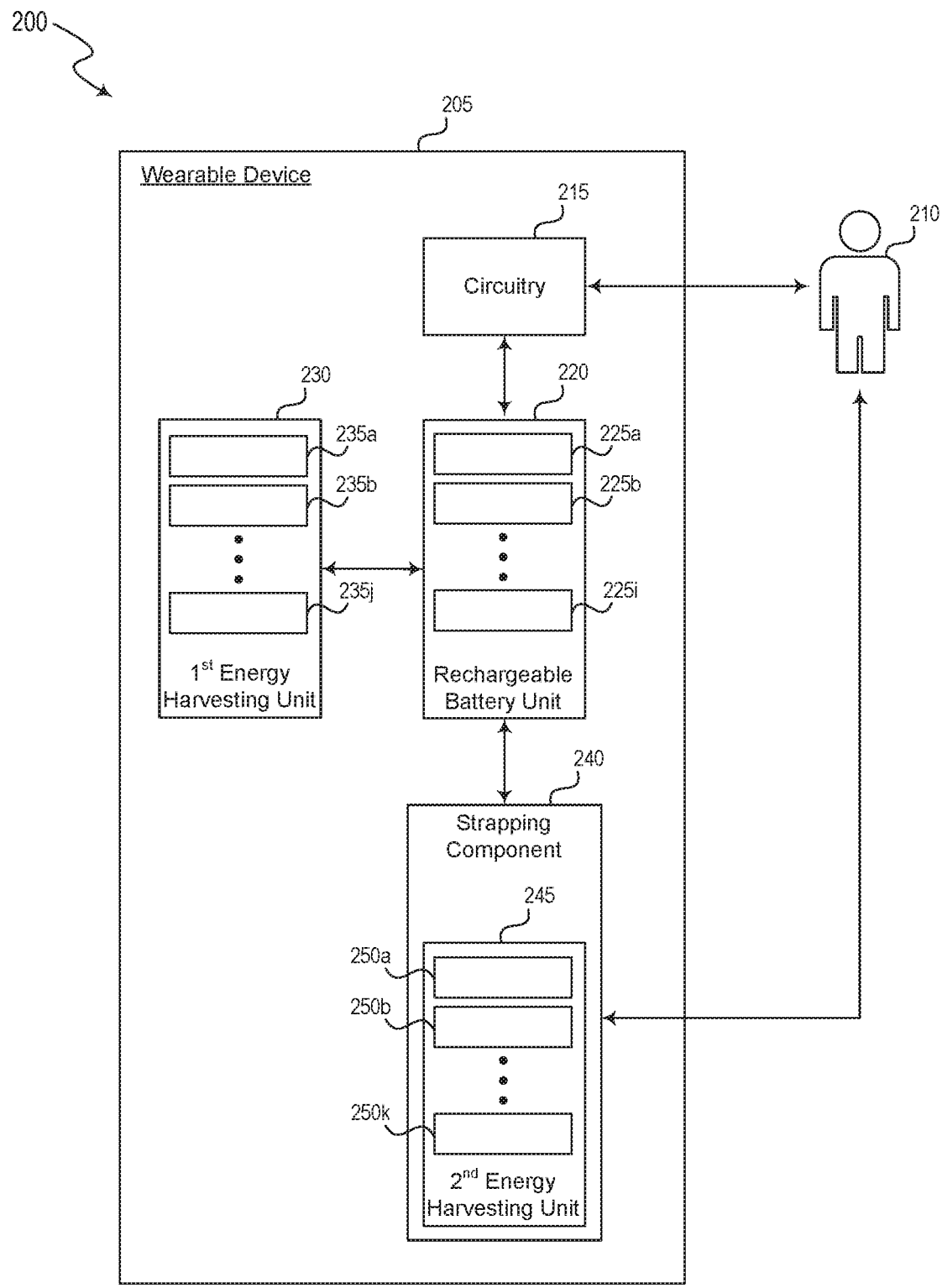
FIG. 2 is a block diagram of a wearable device that supports in-use charging for wearable devices in accordance with embodiments of the present technology.

FIG. 2 is a block diagram 200 including a wearable device 205 that supports in-use charging for wearable devices in accordance with embodiments of the present technology. The diagram 200 also illustrates a person 210 wearing (otherwise using) a wearable device 205. The person 210 may be an example of the person 110 described with reference to FIG. 1. The wearable device 205 may be an example of or include aspects of the wearable device described with reference to FIG. 1. The wearable device 205 may include circuitry 215, a rechargeable battery unit 220 (which includes a set of partitions 225), and a first energy harvesting unit 230 (which includes one or more transducers 235). In some embodiments, the wearable device 205 may also include a strapping component 240 (which includes a second energy harvesting unit 245).

The circuitry 215 may be configured to carry out one or more tasks associated with the person 210 wearing the wearable device 205. For example, the one or more tasks may include providing digital assistance to the person 210 (e.g., similar to a personal digital assistant (PDA)), maintaining wireless connections with other electronic devices of the person 210 (e.g., a mobile phone, a tablet), monitoring and/or collecting physiological parameters and/or vital signs of the person 210, or the like. Additionally, in some embodiments, the wearable device 205 may operate in conjunction with the circuitry 215 to manage various aspects of its operation. For example, the circuitry 215 may sense non-electrical energy proximate to the wearable device 205. Further, the circuitry 215 may activate (or deactivate) one or more transducers in the wearable device 205 and store electrical energy generated by the transducers in the rechargeable battery unit 220. The circuitry 215 may couple one or more transducers of the wearable device 205 (e.g., transducers of the first energy harvesting unit 230, transducers of the second energy harvesting unit 245) with one or more partitions 225 of the rechargeable battery unit 220. Additionally, or alternatively, the circuitry 215 may monitor an amount of total electrical energy in the rechargeable battery unit 220 and solicit an input from the person 210 directed to supplementing (e.g., replenishing) the total electrical energy.

The rechargeable battery unit 220 may be coupled with the circuitry 215 and include the set of partitions 225 (e.g., partitions 225a through 225i). Further, at least one partition 225 of the set (e.g., the partition 225a) may be configured to be detached from the rechargeable battery unit 220 without interrupting the one or more tasks associated with the person 210 wearing the wearable device 205. Moreover, each individual partition 225 of the set may be configured to supply electrical power to the circuitry 215.

The first energy harvesting unit 230 may be coupled with the rechargeable battery unit 220. The first energy harvesting unit 230 may include one or more transducers (e.g., transducers 235a through 235j) that each are configured to convert non-electrical energy into electrical energy. In some embodiments, individual partitions 225 of the rechargeable battery unit 220 may be coupled with corresponding transducers 235 of the first energy harvesting unit 230. In some embodiments, individual partitions 225 of the rechargeable battery unit 220 may be configured to concurrently couple with multiple transducers 235 of the first energy harvesting unit 230. Similarly, individual transducers 235 of the first energy harvesting unit 230 may be configured to concurrently couple with multiple partitions 225 of the rechargeable battery unit 220.

Further, individual partitions 225 (e.g., the partition 225a) of the rechargeable battery unit 220 may be configured to decouple from a first transducer (e.g., the transducer 235a) to couple with a second transducer (e.g., the transducer 235b, the transducer 250b) without interrupting the one or more tasks of the circuitry 215. In some cases, the partition 225a may continue to supply electrical power to the circuitry 215 while switching from the transducer 235a to the transducer 235b (or the transducer 250b). In other cases, the partition 225a may discontinue to supply electrical power to the circuitry 215, but other partitions of the rechargeable battery unit 220 (e.g., partitions 225b through 225i) supplies electrical power to the circuitry 215.

The strapping component 240 may be coupled with the rechargeable battery unit 220 and configured to fasten the wearable device 205 to the person 210. Also, the strapping component 240 may include a second energy harvesting unit 245, which may include one or more transducers (e.g., transducers 250a through 250k) that each are configured to convert non-electrical energy into electrical energy. In some embodiments, individual partitions 225 of the rechargeable battery unit 220 may be coupled with corresponding transducers 250 of the second energy harvesting unit 245. In some embodiments, individual partitions 225 of the rechargeable battery unit 220 may be configured to concurrently couple with multiple transducers 250 of the second energy harvesting unit 245. Similarly, individual transducers 250 of the second energy harvesting unit 245 may be configured to concurrently couple with multiple partitions 225 of the rechargeable battery unit 220. Further, individual partitions 225 of the rechargeable battery unit 220 may be configured to decouple from a first transducer (e.g., the transducer 250a) to couple with a second transducer (e.g., the transducer 250b, the transducer 235b) without interrupting the one or more tasks of the circuitry 215.

The non-electrical energy may include at least one of electromagnetic energy proximate to the person 210, light energy shining to the person 210, thermal energy generated by the person 210, first kinetic energy associated with physical activities by the person 210, or second kinetic energy associated with movements of an equipment that the person 210 operates, as described with reference to FIG. 1.

In some embodiments, the circuitry 215 may monitor an amount of total electrical energy in the rechargeable battery unit 220. As described herein, the rechargeable battery unit 220 may include at least one partition that is configured to be detached without interrupting electrical power to the wearable device 205. The circuitry 215 may display the amount of total electrical energy on a screen of the wearable device 205 when the amount is equal to or less than a threshold (e.g., 20%, 15%, 10%) to solicit an input from the person 210, the input directed to supplementing the total electrical energy. When the person 210 provides the input to supplement the total electrical energy, the circuitry 215 may activate one or more partitions of the rechargeable battery unit 220 to continue to supply the electrical power to the wearable device 205, where the one or more partitions are different from the at least one partition. Subsequently, the circuitry 215 may deactivate the at least one partition from supplying the electrical power to the wearable device 205 such that the wearable device 205 may release the at least one partition from a receptacle of the wearable device 205.

Figure 3:
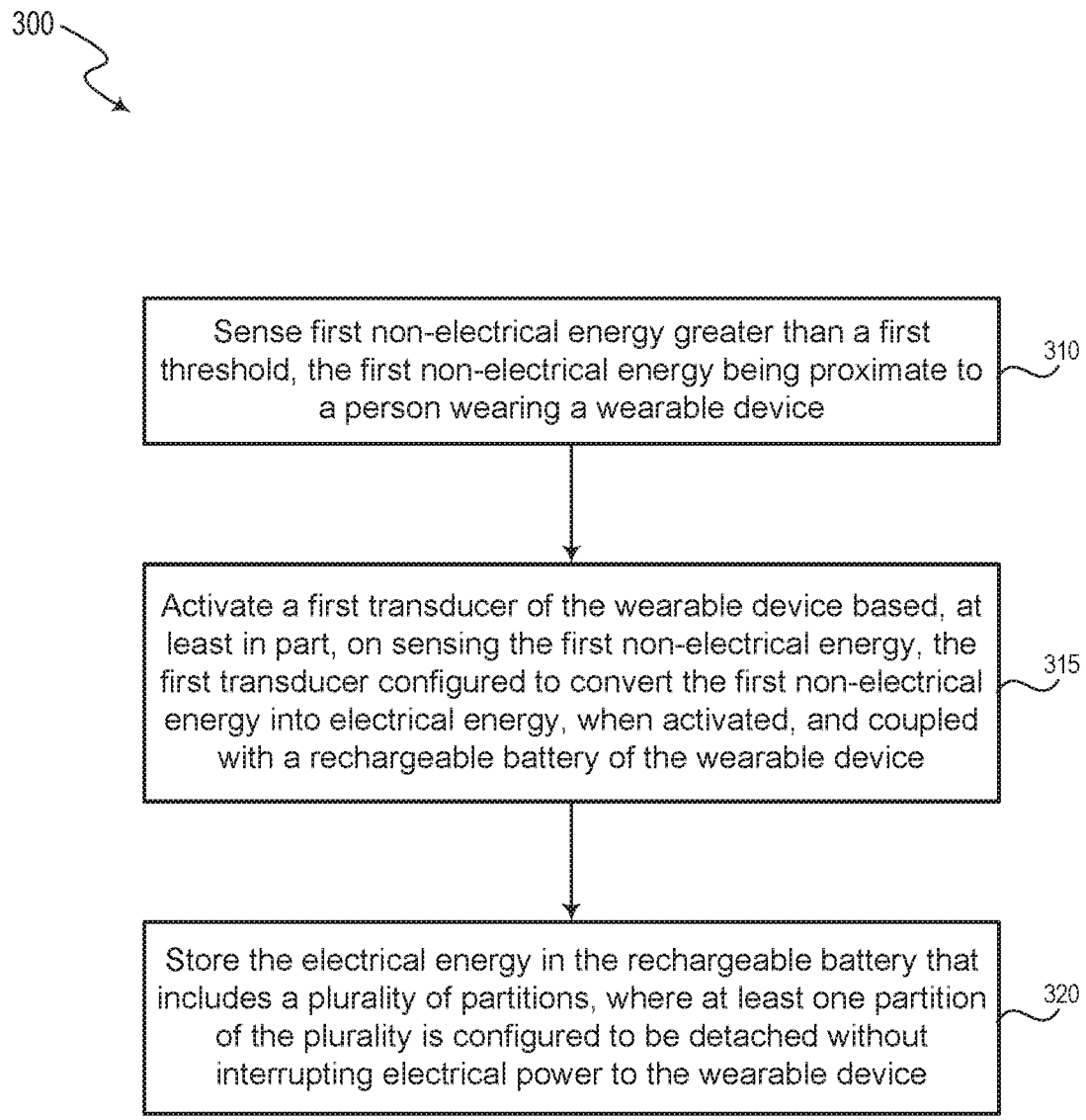
FIGS. 3 and 4 are flowcharts illustrating methods of in-line charging for wearable devices in accordance with embodiments of the present technology.

FIG. 3 is a flowchart 300 illustrating a method of in-line charging for wearable devices in accordance with embodiments of the present technology. The flowchart 300 may be an example of or include aspects of a method that a wearable device (e.g., the wearable device 205) may perform as described with reference to FIGS. 1 and 2.

The method includes sensing first non-electrical energy greater than a first threshold, the first non-electrical energy being proximate to a person wearing a wearable device (box 310). In accordance with one aspect of the present technology, the sensing feature of box 310 can be performed by a wearable device (e.g., the wearable device 205), in conjunction with the circuitry 215 in some cases, as described with reference to FIGS. 1 and 2.

The method further includes activating a first transducer of the wearable device based, at least in part, on sensing the first non-electrical energy, the first transducer configured to convert the first non-electrical energy into electrical energy, when activated, and coupled with a rechargeable battery of the wearable device (box 315). In accordance with one aspect of the present technology, the activating feature of box 315 can be performed by a wearable device (e.g., the wearable device 205), in conjunction with the circuitry 215 in some cases, as described with reference to FIGS. 1 and 2.

The method further includes storing the electrical energy in the rechargeable battery that includes a plurality of partitions, where at least one partition of the plurality is configured to be detached without interrupting electrical power to the wearable device (box 320). In accordance with one aspect of the present technology, the storing feature of box 320 can be performed by a wearable device (e.g., the wearable device 205), in conjunction with the circuitry 215 in some cases, as described with reference to FIGS. 1 and 2.

In some embodiments, the method may further include selecting the first transducer based, at least in part, on sensing the first non-electrical energy greater than the first threshold, where a plurality of transducers of the wearable device includes the first transducer. In some embodiments, the first non-electrical energy includes at least one of electromagnetic energy proximate to the person, light energy shining on the person, thermal energy generated by the person, first kinetic energy associated with physical activities by the person, or second kinetic energy associated with movements of an equipment that the person operates, or any combination thereof.

In some embodiments, the method may further include sensing second non-electrical energy greater than a second threshold, the second non-electrical energy being proximate to the person, activating a second transducer of the wearable device, the second transducer configured to convert the second non-electrical energy into electrical energy, and coupled with the rechargeable battery, and storing the electrical energy in the rechargeable battery. In some embodiments, the first transducer is coupled with a first partition of the rechargeable battery and the second transducer is coupled with a second partition of the rechargeable battery. In some embodiments, the first and second transducers are concurrently coupled with a first partition of the rechargeable battery.

In some embodiments, the method may further include determining that the first non-electrical energy is less than a third threshold, where the first threshold is greater than the third threshold, and deactivating the first transducer of the wearable device based, at least in part, on the determination. In some embodiments, the method may further include determining that a first partition of the rechargeable battery includes room to store additional electrical power, prior to sensing the first non-electrical energy, where the first partition of the rechargeable battery is coupled with the first transducer. In some embodiments, the method may further include determining to supplement electrical power of a first partition of the rechargeable battery, prior to activating the first transducer of the wearable device, where the first partition of the rechargeable battery is coupled with the first transducer.

Figure 4:
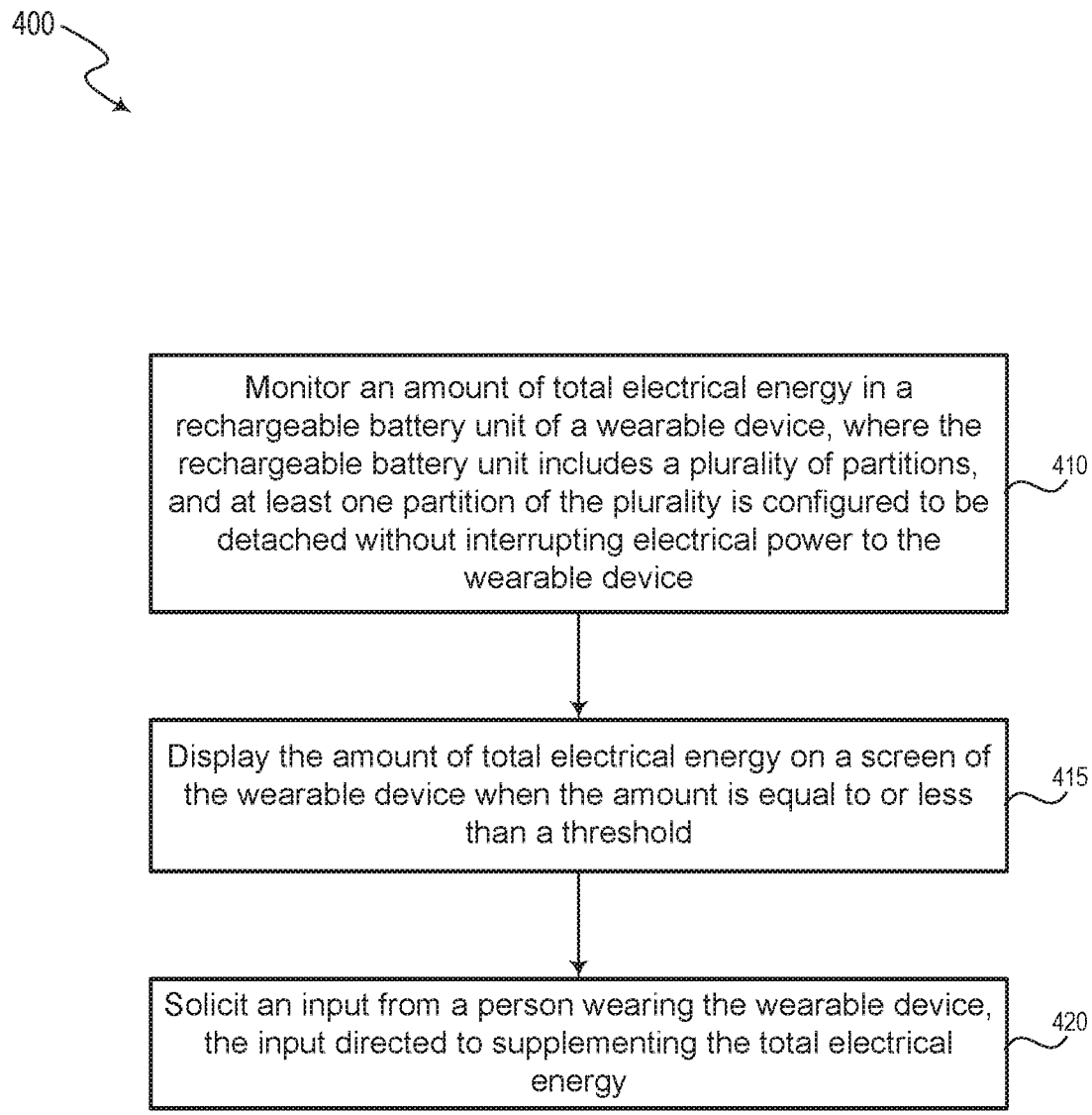

FIG. 4 is a flowchart 400 illustrating a method of in-line charging for wearable devices in accordance with embodiments of the present technology. The flowchart 400 may be an example of or include aspects of a method that a wearable device (e.g., the wearable device 205) may perform as described with reference to FIGS. 1 and 2.

The method includes monitoring an amount of total electrical energy in a rechargeable battery unit of a wearable device, where the rechargeable battery unit includes a plurality of partitions, and at least one partition of the plurality is configured to be detached without interrupting electrical power to the wearable device (box 410). In accordance with one aspect of the present technology, the monitoring feature of box 410 can be performed by a wearable device (e.g., the wearable device 205), in conjunction with the circuitry 215 in some cases, as described with reference to FIGS. 1 and 2.

The method further includes displaying the amount of total electrical energy on a screen of the wearable device when the amount is equal to or less than a threshold (box 415). In accordance with one aspect of the present technology, the displaying feature of box 415 can be performed by a wearable device (e.g., the wearable device 205), in conjunction with the circuitry 215 in some cases, as described with reference to FIGS. 1 and 2.

The method further includes soliciting an input from a person wearing the wearable device, the input directed to supplementing the total electrical energy (box 420). In accordance with one aspect of the present technology, the soliciting feature of box 420 can be performed by a wearable device (e.g., the wearable device 205), in conjunction with the circuitry 215 in some cases, as described with reference to FIGS. 1 and 2.

In some embodiments, the method may further include activating one or more partitions of the rechargeable battery unit to supply the electrical power to the wearable device when the input from the person corresponds to supplementing the total electrical energy, where the one or more partitions of the rechargeable battery unit are different from the at least one partition. In some embodiments, the method may further include deactivating the at least one partition from supplying the electrical power to the wearable device when the input from the person corresponds to supplementing the total electrical energy. In some embodiments, the method may further include releasing the at least one partition from a receptacle of the wearable device after deactivating the at least one partition.

Although in the foregoing examples, wearable devices that support in-use charging have been described and illustrated as electronic devices to wear on wrists of the users, in other embodiments, alternative configurations of wearable devices may be implemented in accordance with embodiments of the present technology. For example, the wearable devices may be incorporated into forms of rings, necklaces, bracelets, headbands, glasses, waist belts, something wearable on ankles, or the like. Further, in addition to the non-electrical energy and corresponding transducers described herein, different types of non-electrical energy and different energy conversion techniques to generate electrical energy may be used to support the in-use charging for wearable devices in accordance with embodiments of the present technology. For example, the airflow around the wearable devices may be a source of electrical energy that supports in-use charging for wearable devices in accordance with the present technology. In other examples, piezoelectric transducers may be incorporated into wearable devices for ankles to convert impact (or vibration) energy associated with footsteps of the users.

It should be noted that the methods described above describe possible implementations, and that the operations and the steps may be rearranged or otherwise modified and that other implementations are possible. Furthermore, embodiments from two or more of the methods may be combined.

The functions described herein may be implemented in hardware, software executed by a processor, firmware, or any combination thereof. Other examples and implementations are within the scope of the disclosure and appended claims. Features implementing functions may also be physically located at various positions, including being distributed such that portions of functions are implemented at different physical locations.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

From the foregoing, it will be appreciated that specific embodiments of the invention have been described herein for purposes of illustration, but that various modifications may be made without deviating from the scope of the invention. Rather, in the foregoing description, numerous specific details are discussed to provide a thorough and enabling description for embodiments of the present technology. One skilled in the relevant art, however, will recognize that the disclosure can be practiced without one or more of the specific details. In other instances, well-known structures or operations often associated with wearable devices and systems are not shown, or are not described in detail, to avoid obscuring other aspects of the technology. In general, it should be understood that various other devices, systems, and methods in addition to those specific embodiments disclosed herein may be within the scope of the present technology.

What is claimed is:

1. A wearable device, comprising:
    circuitry configured to carry out one or more tasks associated with a person wearing the wearable device;
    a rechargeable battery unit coupled with the circuitry, wherein the rechargeable battery unit includes at least one partition configured to be detached from the rechargeable battery unit without interrupting the one or more tasks;
    a first energy harvesting unit coupled with the rechargeable battery unit, wherein the first energy harvesting unit includes one or more transducers that each are configured to convert non-electrical energy into electrical energy; and
    a strapping component coupled with the rechargeable battery unit, and configured to fasten the wearable device to the person, wherein the strapping component includes a second energy harvesting unit.

2. The device of claim 1, wherein the non-electrical energy includes at least one of:
    electromagnetic energy proximate to the person;
    light energy shining to the person;
    thermal energy generated by the person;
    first kinetic energy associated with physical activities by the person; or
    second kinetic energy associated with movements of an equipment that the person operates.

3. The device of claim 1, wherein the rechargeable battery unit includes a plurality of partitions that each are configured to supply electrical power to the circuitry, the plurality of partitions including the at least one partition.

4. The device of claim 3, wherein individual partitions of the plurality are coupled with corresponding transducers of the one or more transducers.

5. The device of claim 3, wherein individual partitions of the plurality are configured to concurrently couple with multiple transducers of the one or more transducers.

6. The device of claim 3, wherein individual partitions of the plurality are configured to decouple from a first transducer to couple with a second transducer without interrupting the one or more tasks, wherein the one or more transducers include the first and second transducers.

7. A method, comprising:
    sensing first non-electrical energy greater than a first threshold, the first non-electrical energy being proximate to a person wearing a wearable device;
    activating a first transducer of the wearable device based, at least in part, on sensing the first non-electrical energy, the first transducer configured to convert the first non-electrical energy into electrical energy, when activated, and coupled with a rechargeable battery of the wearable device; and
    storing the electrical energy in the rechargeable battery that includes a plurality of partitions, wherein at least one partition of the plurality is configured to be detached without interrupting electrical power to the wearable device.

8. The method of claim 7, further comprising:
    selecting the first transducer based, at least in part, on sensing the first non-electrical energy greater than the first threshold, wherein a plurality of transducers of the wearable device includes the first transducer.

9. The method of claim 7, wherein the first non-electrical energy comprises at least one of:
electromagnetic energy proximate to the person;
light energy shining on the person;
thermal energy generated by the person;
first kinetic energy associated with physical activities by the person; or
second kinetic energy associated with movements of an equipment that the person operates; or
any combination thereof.

10. The method of claim 7, further comprising:
sensing second non-electrical energy greater than a second threshold, the second non-electrical energy being proximate to the person;
activating a second transducer of the wearable device, the second transducer configured to convert the second non-electrical energy into electrical energy, and coupled with the rechargeable battery; and
storing the electrical energy in the rechargeable battery.

11. The method of claim 10, wherein:
the first transducer is coupled with a first partition of the rechargeable battery; and
the second transducer is coupled with a second partition of the rechargeable battery.

12. The method of claim 10, wherein:
the first and second transducers are concurrently coupled with a first partition of the rechargeable battery.

13. The method of claim 7, further comprising:
determining that the first non-electrical energy is less than a third threshold, wherein the first threshold is greater than the third threshold; and
deactivating the first transducer of the wearable device based, at least in part, on the determination.

14. The method of claim 7, further comprising:
determining that a first partition of the rechargeable battery includes room to store additional electrical power, prior to sensing the first non-electrical energy, wherein the first partition of the rechargeable battery is coupled with the first transducer.

15. The method of claim 7, further comprising:
determining to supplement electrical power of a first partition of the rechargeable battery, prior to activating the first transducer of the wearable device, wherein the first partition of the rechargeable battery is coupled with the first transducer.

* * * * *